(12) United States Patent
Cheng et al.

(10) Patent No.: US 6,880,054 B2
(45) Date of Patent: Apr. 12, 2005

(54) PORTABLE DATA STORAGE DEVICE HAVING A SECURE MODE OF OPERATION

(75) Inventors: Chong Seng Cheng, Loyang Way (SG); Teng Pin Poo, Singapore (SG)

(73) Assignee: Trek Technology (Singapore) Pte. Ltd.

( * ) Notice: Subject to any disclaimer, the term of this patent is extended or adjusted under 35 U.S.C. 154(b) by 78 days.

(21) Appl. No.: 09/803,157

(22) Filed: Mar. 9, 2001

(65) Prior Publication Data

US 2002/0010827 A1 Jan. 24, 2002

Related U.S. Application Data

(63) Continuation of application No. PCT/SG00/00029, filed on Feb. 21, 2000.

(51) Int. Cl.[7] .................................................. G06F 13/00
(52) U.S. Cl. ........................ 711/164; 711/163; 713/200; 713/202
(58) Field of Search ................................ 711/103, 164, 711/163; 707/9; 713/200, 202, 1, 2, 201

(56) References Cited

U.S. PATENT DOCUMENTS

| | | | |
|---|---|---|---|
| 4,853,523 A | 8/1989 | Talmadge | |
| 4,988,855 A | 1/1991 | Iijima | |
| 5,291,584 A | 3/1994 | Challa et al. | |
| 5,297,148 A | 3/1994 | Harari et al. | |
| 5,375,243 A | * 12/1994 | Parzych et al. | ............... 380/52 |
| 5,414,425 A | 5/1995 | Whiting et al. | |
| 5,442,704 A | 8/1995 | Holtey | |
| 5,485,519 A | 1/1996 | Weiss | |
| 5,490,096 A | 2/1996 | Seto | |
| 5,517,014 A | 5/1996 | Iijima | |
| 5,583,538 A | 12/1996 | Watanabe et al. | |
| 5,588,146 A | 12/1996 | Leroux | |
| 5,621,798 A | 4/1997 | Aucsmith | |

(Continued)

FOREIGN PATENT DOCUMENTS

| | | |
|---|---|---|
| CN | 99117225.6 | 4/2001 |
| DE | 37 06 466 A | 9/1988 |
| DE | 195 36 206 A1 | 4/1996 |
| DE | 196 45 937 A 1 | 5/1998 |
| DE | 197 12 053 A 1 | 9/1998 |
| DE | 100 57697 A1 | 5/2002 |

OTHER PUBLICATIONS

"MacHUSP USB"; Aladdin Knowledge Systems Inc.; (advertising material).
"Techlink Seminar 3 New Mac Hardware and Peripherals"; Sue Rogers; Nov. 19, 1999.

(Continued)

*Primary Examiner*—Mano Padmanabhan
*Assistant Examiner*—Jasmine Song
(74) *Attorney, Agent, or Firm*—White & Case LLP

(57) ABSTRACT

A portable data storage device (10) includes a universal serial bus (USB) coupling device (1) and an interface device (2) is coupled to the USB coupling device (1). The portable data storage device (10) also includes a memory control device (3) and a non-volatile solid-state memory device (4). The memory control device (3) is coupled between the interface device (2) and the memory device (4) to control the flow of data from the memory device (4) to the USB coupling device (1).

5 Claims, 3 Drawing Sheets

U.S. PATENT DOCUMENTS

| | | | |
|---|---|---|---|
| 5,646,646 A | | 7/1997 | Inoue et al. |
| 5,663,901 A | | 9/1997 | Wallace et al. |
| 5,684,742 A | | 11/1997 | Bublitz et al. |
| 5,815,426 A | | 9/1998 | Jigour et al. |
| 5,844,986 A | | 12/1998 | Davis |
| 5,850,189 A | | 12/1998 | Sakanaka et al. |
| 5,867,802 A | | 2/1999 | Borza |
| 5,935,244 A | | 8/1999 | Swamy et al. |
| 5,949,882 A | | 9/1999 | Angelo |
| 6,003,135 A | | 12/1999 | Bialick et al. |
| 6,016,476 A | | 1/2000 | Maes et al. |
| 6,038,320 A | * | 3/2000 | Miller ............ 380/44 |
| 6,047,376 A | | 4/2000 | Hosoe |
| 6,067,625 A | * | 5/2000 | Ryu ............ 713/202 |
| 6,088,755 A | | 7/2000 | Kobayashi et al. |
| 6,145,045 A | | 11/2000 | Falik et al. |
| 6,151,657 A | * | 11/2000 | Sun et al. ............ 711/103 |
| 6,182,162 B1 | * | 1/2001 | Estakhri et al. ............ 710/11 |
| 6,199,122 B1 | | 3/2001 | Kobayashi |
| 6,219,439 B1 | | 4/2001 | Burger |
| 6,286,087 B1 | * | 9/2001 | Ito et al. ............ 711/111 |
| 6,324,537 B1 | * | 11/2001 | Moran ............ 707/100 |
| 6,330,624 B1 | * | 12/2001 | Cromer et al. ............ 710/200 |
| 6,361,369 B1 | | 3/2002 | Kondo et al. |
| 6,385,667 B1 | * | 5/2002 | Estakhri et al. ............ 710/8 |
| 6,385,677 B1 | | 5/2002 | Yao |
| 6,457,099 B1 | | 9/2002 | Gilbert |
| 6,477,206 B1 | | 11/2002 | Chatani |
| 6,577,337 B1 | | 6/2003 | Kang |
| 6,628,325 B1 | | 9/2003 | Steinberg et al. |
| 2001/0029583 A1 | | 10/2001 | Palatov et al. |
| 2001/0030827 A1 | | 10/2001 | Morohashi |
| 2001/0047441 A1 | | 11/2001 | Robertson |
| 2002/0010857 A1 | | 1/2002 | Karthik et al. |
| 2002/0029343 A1 | | 3/2002 | Kurita et al. |
| 2002/0116565 A1 | | 8/2002 | Wang et al. |
| 2002/0145507 A1 | | 10/2002 | Foster |
| 2002/0147882 A1 | | 10/2002 | Pua et al. |
| 2002/0167546 A1 | | 11/2002 | Kimbell et al. |
| 2003/0063196 A1 | | 4/2003 | Palatov et al. |
| 2003/0163634 A1 | | 8/2003 | Kim |

FOREIGN PATENT DOCUMENTS

| | | |
|---|---|---|
| EP | 0 152 024 B1 | 8/1985 |
| EP | 0 703 544 A | 3/1996 |
| EP | 0 856 818 A2 A3 | 5/1998 |
| EP | 0 883 083 A1 | 9/1998 |
| EP | 0 924 656 A2 | 6/1999 |
| EP | 0 924 657 A2 | 6/1999 |
| EP | 0 929 043 A1 | 7/1999 |
| EP | 0945777 A3 | 9/1999 |
| EP | 1 030 494 A1 | 8/2000 |
| EP | 1 100 000 A2 | 5/2001 |
| EP | 0 912 939 B1 | 9/2001 |
| EP | 1139224 A2 | 10/2001 |
| EP | 1146559 A1 | 10/2001 |
| EP | 1 156 697 A1 | 11/2001 |
| GB | 2 204 971 A | 11/1988 |
| GB | 2 312 040 A | 10/1997 |
| JP | 9069067 | 3/1997 |
| JP | 11266384 A | 9/1999 |
| JP | 2000 048177 | 2/2000 |
| JP | 2000 200123 | 7/2000 |
| JP | 2000 209534 A | 7/2000 |
| JP | 2002-200248 | 7/2000 |
| JP | 2001 242965 A | 9/2001 |
| JP | 2001 290753 A | 10/2001 |
| JP | 2001 344173 | 12/2001 |
| JP | 2002 157195 | 5/2002 |
| JP | 2002 232769 A | 8/2002 |
| JP | 2002 359763 A | 12/2002 |
| JP | 2003 186782 A | 7/2003 |
| KR | 2002 085497 A | 11/2002 |
| TW | 431101 | 4/2001 |
| TW | 439377 | 6/2001 |
| TW | 453071 | 9/2001 |
| WO | WO 87/07063 | 11/1987 |
| WO | WO 89/12287 A | 12/1989 |
| WO | WO 98/07255 | 2/1998 |
| WO | WO 98/12670 | 3/1998 |
| WO | WO 98/13791 A | 4/1998 |
| WO | WO 99/08238 | 2/1999 |
| WO | WO 99/13434 A1 | 3/1999 |
| WO | WO 99/16024 A1 | 4/1999 |
| WO | WO 99/56429 A1 | 4/1999 |
| WO | WO 99/45460 | 9/1999 |
| WO | WO 00/07387 | 2/2000 |
| WO | WO 00/42491 | 7/2000 |
| WO | WO 00/60476 | 10/2000 |
| WO | WO 01/08055 A1 | 2/2001 |
| WO | WO 01/09845 A1 | 2/2001 |
| WO | WO 01/16917 A2 | 3/2001 |
| WO | WO 01/22351 | 3/2001 |
| WO | WO 01/23987 | 4/2001 |
| WO | WO 01/31577 A1 | 5/2001 |
| WO | WO 01/33317 A1 | 5/2001 |
| WO | WO 01/48612 A1 | 7/2001 |
| WO | WO 01/73570 A | 10/2001 |
| WO | WO 01/86640 A2 A3 | 11/2001 |

OTHER PUBLICATIONS

"Universal Serial Bus Mass Storage Class Specification Overview"; V1.0 Revision; Oct. 22, 1998.

Universal Serial Bus Mass Storage Class / UFI Command Specification; Revision 1.0; Dec. 14, 1998.

"Which External I/O Bus Is Right For You?"; Jason Ziller and David Fair; Intel Corp.; Intel Developer UPDATE Magazine; Jan. 2000.

PowerPoint presentation by M–Systems Flash Disk Pioneer Ltd.

Affidavit of Cheng Xiaohua of Netac Technology Co. Ltd., China; submitted to the High Court of the Republic of Singapore in Suit No. S672/2002/S; Jun. 3, 2002.

Statutory Declaration of Cheng Xiaohua of Netac Technology Co. Ltd., China; executed under oath in Singapore; Sep. 8, 2003.

* cited by examiner

PORTABLE DATA STORAGE DEVICE HAVING A SECURE MODE OF OPERATION

This application is a continuation of international application No. PCT/SG00/00029, filed Feb. 21, 2000 (pending).

FIELD OF INVENTION

The invention relates to a portable data storage device, and in particular, a portable data storage device for a computer.

BACKGROUND

Conventional data storage devices generally fall into two categories. The first category is electronic, solid-state memory devices such as read only memory (ROM) and random access memory (RAM). These memory devices are generally fitted within the computer. They are not intended to be removable or portable so that they may be used on different computers, for example, to permit the transfer of data from one computer to another computer.

The second type of device is surface based data storage devices in which data is stored, typically, on the surface of a disk or tape. Examples of surface storage devices are magnetic disks and CD ROMs. Such data storage devices require a mechanical drive mechanism to be installed in or coupled to the computer to permit the data on the storage device to be read by the computer. In addition, such memory devices are limited by the surface area of the storage device, and the combination of the storage device and the drive mechanism for reading data from the storage device is generally bulky and/or delicate due to the moving parts that are required within the drive mechanism and/or storage device.

SUMMARY OF THE INVENTION

In accordance with the present invention, there is provided a portable data storage device comprising a coupling device for coupling to a computer serial bus, an interface device coupled to the coupling device, a memory control device and a non-volatile solid-state memory device; the memory control device being coupled between the interface device and the memory device to control the flow of data from the memory device to the coupling device.

An advantage of the invention is that by providing a portable data storage device comprising a coupling device with an interface device, memory control device and a non-volatile solid-state memory device, it is possible to provide a portable data storage device which may be coupled to a computer having a serial bus port and which does not include moving parts or require a mechanical drive mechanism to read the data from the data storage device.

Preferably, the non-volatile solid-state memory device may be a read/write memory device, such as a flash memory device.

Preferably, where the memory device is a read/write memory device, the memory control device controls the flow of data to and from the memory device.

Typically, the data storage device further comprises a manually operated switch movable between a first position in which writing of data to the memory device is enabled, and a second position in which writing of data to the memory device is prevented.

Preferably, the memory control device may include a read only memory which stores a program to control the operation of the memory control device. Preferably, the memory control device is a micro-controller.

Typically, the interface device comprises a universal serial bus (USB) driver to convert data between a USB format and a PC format, and the coupling device comprises a USB coupling deivce.

Alternatively, the interface device comprises a driver for IEEE 1394 (Firewire) protocol, and the coupling device comprises a Firewire coupling device.

BRIEF DESCRIPTION OF THE DRAWINGS

An example of a data storage device in accordance with the invention will now be described to the accompanying drawings, in which.

DETAILED DESCRIPTION OF THE PREFERRED EMBODIMENTS

Figure 1:
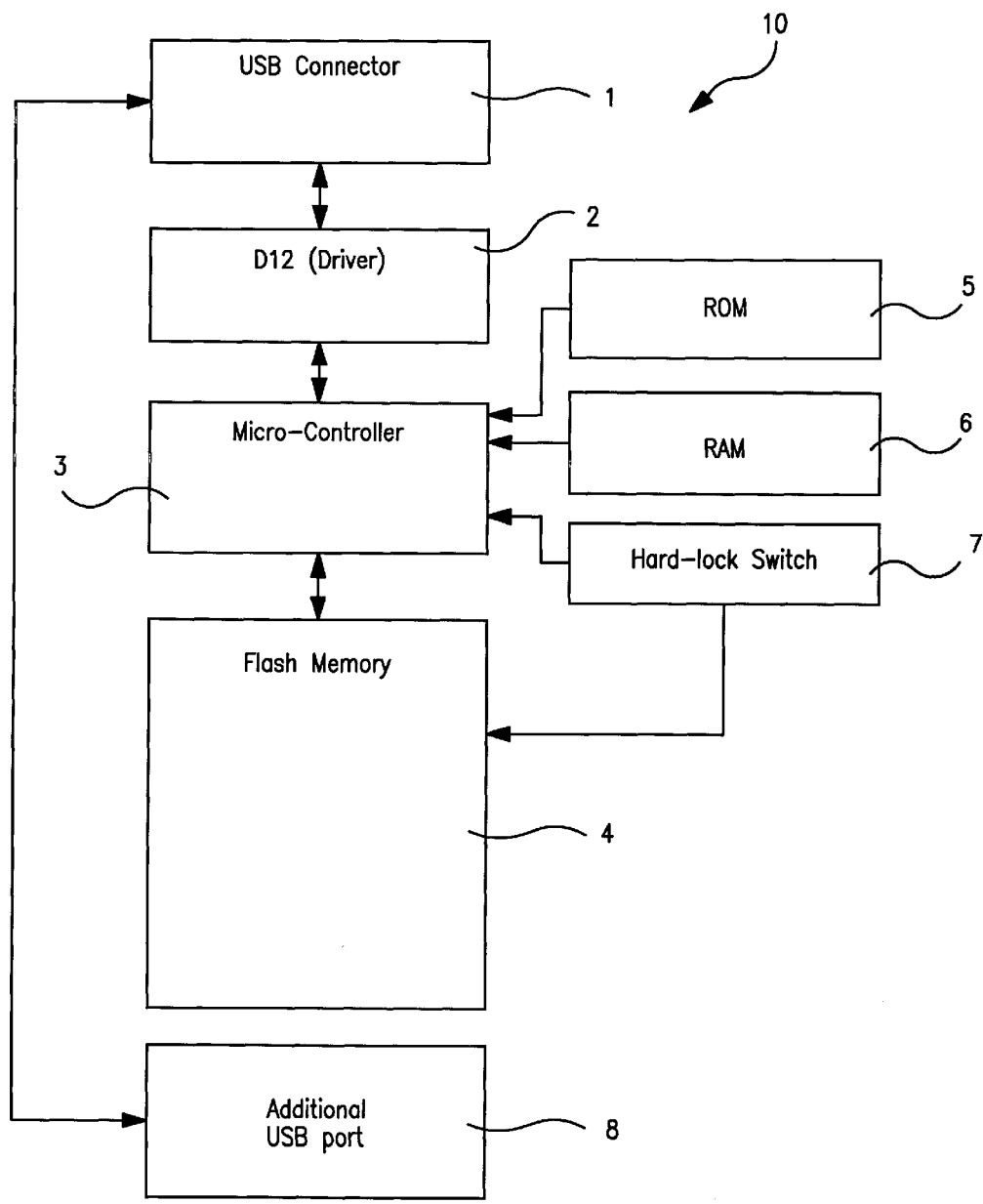
FIG. 1 is a schematic block diagram of a portable data storage device.

FIG. 1 shows a data storage device 10 which includes a USB plug 1 which is coupled to a USB interface device 2. The USB interface device 2 is coupled to a micro-controller 3 which is coupled to a flash memory 4. The micro-controller 3 includes a read only memory (ROM) 5 which stores a program to control the operation of the micro-controller 3.

The operations performed by the micro-controller 3 include comparing passwords entered by a user with a corresponding password stored in the flash memory 4 to determine whether the user is authorised to access the contents of the flash memory 4. The program stored in the ROM 5 also controls the data flow to and from the flash memory 4 and can also detect whether the computer to which the memory device 1 is coupled has installed software programs which correspond to passwords stored in the flash memory 4. The micro-controller 3 can automatically retrieve passwords from the installed software to compare with passwords stored in the flash memory to verify that a user of the computer is authorised to access and run the software. In addition, the program stored in the ROM 5 also permits the setting of a password in the flash memory by a software supplier to correspond to the password contained in software supplied to a user. Typically, the password may correspond to the serial number of the software.

The flash memory 4 is typically divided into a number of different sections or zones. Typically, the flash memory is divided into two zones and each zone has a unique password. If the data storage device 10 is supplied with packaged software, the software serial number can be set in one zone to be the password to permit a user to access and use the software. The other zone, which can be used typically for storing a user's data, may have a separate password which is set by the user. Typically, the passwords are stored in a secure location of the flash memory in an encrypted form. The encryption, decryption, data flow control and USB protocol are all managed by the micro-controller 3.

The micro-controller 3 also includes a random access memory (RAM) 6 which is a temporary storage area to permit functioning of the micro-controller 3. In addition, a manual switch 7 is coupled between the flash memory 4 and the micro-controller 3. The manual switch 7 is movable between a first position in which a user may write data to the flash memory 4 and a second position in which data is prevented from being written to the flash memory 4.

The device 10 also includes a USB socket 8 that is coupled directly to the USB plug 1 and permits other USB devices to be coupled to the USB via the device 10. For example, if a user wishes to increase memory space, a USB plug 1 of a second memory device 10 may be connected to the USB socket 8.

Figure 2:
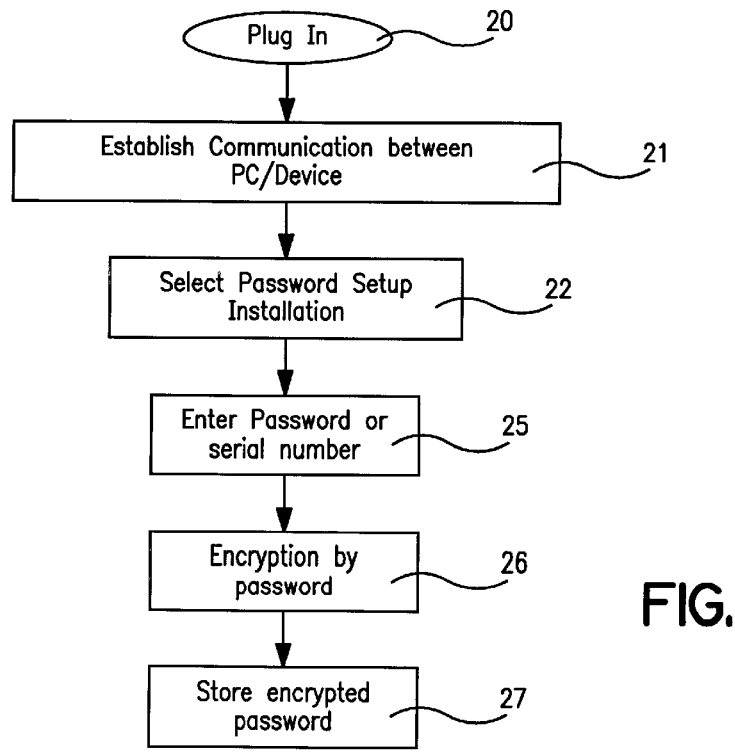
FIG. 2 is a flow diagram showing the initial setup of the data storage device by a software supplier.

FIG. 2 is a flow diagram showing the set up procedure for the device 10 for a software supplier when the software supplier intends to supply the device as an authentication device for the software. Firstly, the plug 1 of the device 10 is plugged into 20 to a USB socket on a computer. After the device 10 has been plugged into the USB socket on the computer, a communication is established 21 between the computer and the device 10. The software supplier has pre-installed installation software on the computer which is run by the operator. From the pre-installed software, the operator selects password set up installation 22, in response to which the pre-installed software requests the operator to enter a password or serial number corresponding to the software with which the device 10 is to be supplied. The password or serial number is then encrypted 26 and stored 27 in the flash memory 4.

Figure 3:
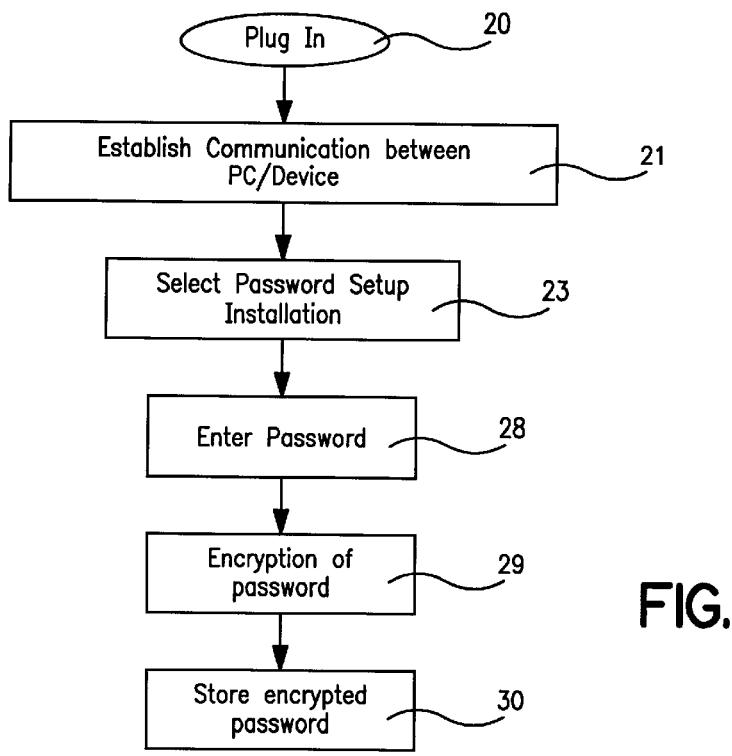
FIG. 3 is a flow diagram showing the initial setup of the data storage device by an end user.

FIG. 3 is a flow diagram showing the initial set-up of a password for zone 2 of the flash memory 4 by an end user. The device 10 is typically supplied with driver software that is loaded by the user onto the computer prior to set-up of the device. To set-up the password for zone 2 the user plugs in 20 the device 10 into a USB port on the computer and communication 21 is established between the computer and the device 10. The user then runs the driver software and the driver software enters a password installation set-up mode 23 for zone 2. The user then enters 28 a password that they wish to use to prevent unauthorised access to zone 2 of the flash memory 4. The password entered is then encrypted 29 and stored 30 in the flash memory 4.

Figure 4:
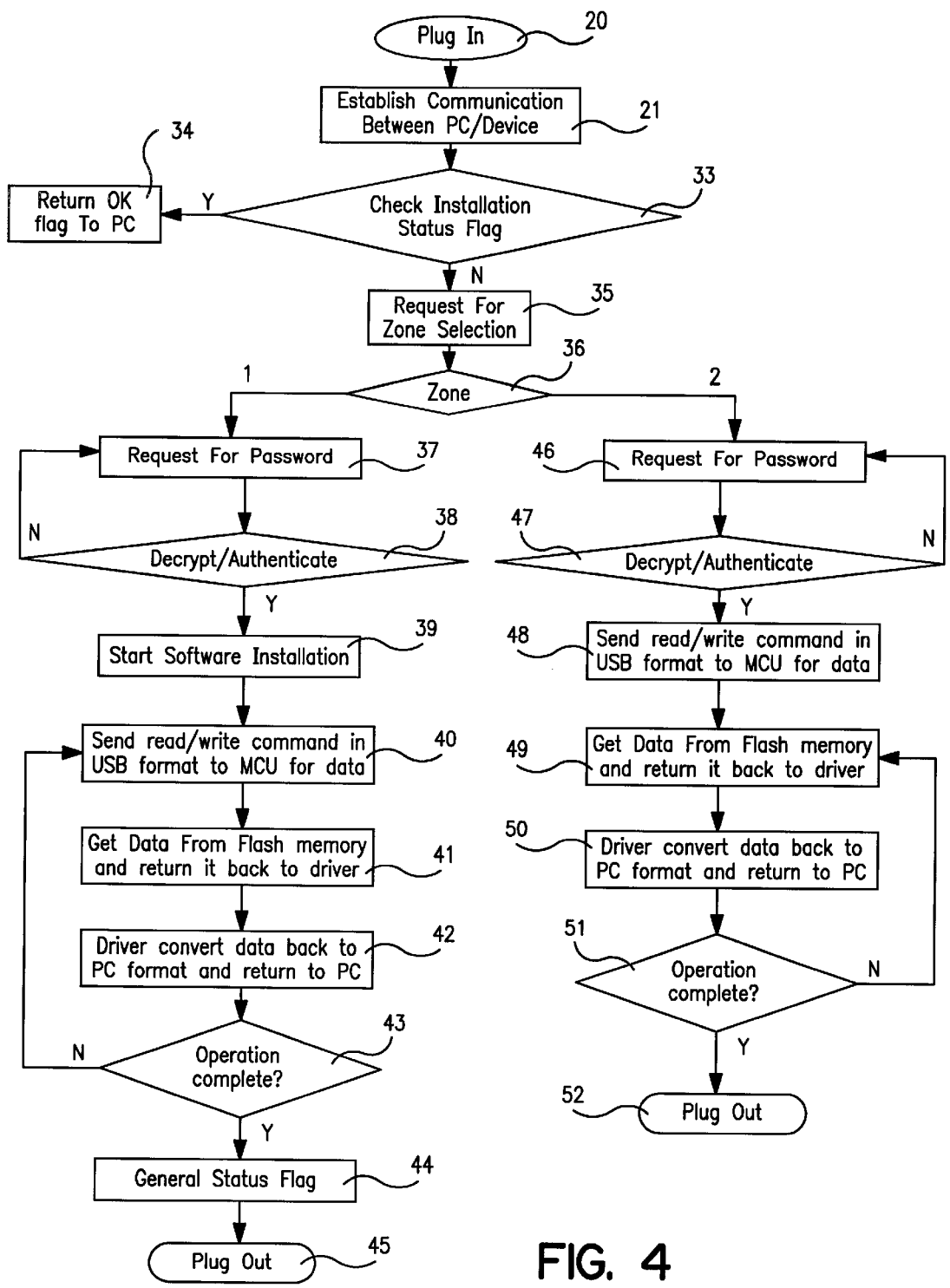
FIG. 4 is a flow diagram showing operation of the data storage device.

After an end user has performed the initial password set up procedure described above and shown in FIG. 3, when a user plugs in 20 the device 10 to a USB port on a computer, the computer will establish a communication 21 with the device 10 and firstly, checks 33 an installation status flag stored in the flash memory 4 (see FIG. 4). If the status flag is "Y", the device 10 outputs 34 an "OK" flag to the computer. The micro-controller 3 the instructs the computer to issue a request 35 to the user to select the zone they wish to enter. If the status flag is "N", the device does not output an "OK" flag to the computer, and goes straight to step 35. In response to the request 35 for zone selection, the user selects 36 either zone 1 or zone 2.

If zone 1 is selected, the device 10 assumes that the user wishes to install software on the computer which is stored in the flash memory 4 and requests 37 the appropriate password for confirmation that the user is authorised to install the software. The micro-controller 3 receives the password entered by the user, retrieves the zone 1 password stored in the flash memory 4, decrypts the zone 1 password and compares it with the password entered by the user to authenticate 38 whether the user is authorised to install the software. If the passwords do not match, the device 10 prompts the computer to request 37 the user to enter the password again.

If the password entered by the user matches the password stored in the flash memory 4, the micro-controller 3 starts 39 the software installation from the flash memory 4 to the computer. In order to install software, the computer sends 40 a read/write command in USB format to the micro-controller 3 for data, the micro-controller 3 retrieves the requested data from the flash memory 4 and sends 41 the data to the driver 2. The driver 2 converts 42 the data to PC format and outputs the data to the computer through the USB plug 1. The micro-controller 3 then checks 43 whether the software installation is complete. If the operation is not complete, the operation returns to step 40. If the installation of the software is complete, the status flag stored in the flash memory 4 is changed to "Y" and the device 10 may then be removed 45 from the USB socket on the computer, If a user selects zone 2, the micro-controller 3 sends a command to the computer to request 46 the user to enter the password for zone 2. When the user enters the password, the computer sends the password to the micro-controller 3. The micro-controller 3 retrieves the password for zone 2 from the flash memory 4, decrypts 47 the password and compares it with the password entered by the user. If the password entered by the user is incorrect, the operation returns to step 46 and the computer requests 46 the user for the password again.

If the password entered by the user is correct, the user has access to zone 2 of the flash memory 4 to read data from the flash memory 4 and to write data to the flash memory 4. However, data can only be written to the flash memory 4 if the manual switch 7 is in the position to permit data to be written to the flash memory 4. In order to read or write data from or to the flash memory 4 a read or write command is sent 48 by the computer in USB format to the micro-controller 3. In response to the read or write command the micro-controller 3 either retrieves 49 data from the flash memory 4 and sends it to the driver 2 for conversion 50 to PC format and then to be output to the computer or receives data from the driver to write it to the flash memory 4.

The micro-controller 3 then determines 51 whether the read or write operation is complete. If the operation is not complete it returns to step 48. If the operation is complete the operation terminates 52.

The device 10 described above is for coupling to a universal serial bus (USB). However, the plug 1, the interface device 2 and socket 8 could be for use with any appropriate computer serial bus. For example, the device 10 could be modified for use with IEEE 1394 (Firewire) protocol by substituting the USB plug 1, USB interface device 2 and socket 8 with a Firewire protocol compatible plug, interface device and socket respectively.

An advantage of the device 10 described above is that it provides a portable data storage device for a computer which does not require a mechanical operated reading/writing device. In addition, the device 10 has no moving parts. This enables to data storage device 10 to be more compact than conventional portable data storage devices.

What is claimed is:

1. A method of preparing a portable data storage device having a secure operation mode for use as a software authentication device, the method comprising the steps of:

activating the secure operation mode of the portable data storage device;

communicatively coupling the portable data storage device to a data bus of a computer system via a universal serial bus (USB) port or a IEEE 1394 (Firewire) port;

running a set-up program installed on the computer system to initiate a password set-up procedure;

responsive to a request for password entry presented by the password set-up procedure, entering a unique password corresponding to a specific copy of an end-user software package that is to be supplied with the portable data storage device;

encrypting the unique password; and storing the encrypted unique password in the portable data storage device;

wherein an end-user can subsequently use the portable data storage device having the encrypted unique password stored therein to authenticate the specific copy of the end-user software package.

2. A method of implementing access security in a portable data storage device that can be communicatively coupled to a computer system via a universal serial bus (USB) port or a IEEE 1394 (Firewire) port, the method comprising the steps of:

activating a secure operation mode of the portable data storage device;

generating a zone selection request upon successful coupling of the portable data storage device to the computer system, the portable data storage device having a memory divided into a plurality of zones, each of which has a zone-specific validation key stored in the memory;

receiving a zone selection entered by a user in response to the zone selection request, the zone selection being indicative of one of the plurality of zones of the memory in the portable data storage device which the user requests to access;

responsive to a request to access a selected zone as indicated by the zone selection, prompting the user for an access key;

decrypting the zone-specific validation key of the selected zone;

comparing the access key entered by the user with the decrypted zone-specific validation key of the selected zone; and provided that the access key matches the decrypted zone-specific validation key of the selected zone, granting the user access to the selected zone.

3. A method of restricting access to data in a portable data storage device capable of being coupled to a computer system, the method comprising the steps of:

receiving a portable data storage device that comprises a USB plug capable of being coupled to a USB socket of the computer system, a memory device including non-volatile solid-state memory, and a memory control device coupled to the memory device capable of controlling data flow to and from the memory device, wherein access to at least a portion of data in the memory device is restricted absent password authentication;

generating a prompt for password entry upon receipt of the portable data storage device;

receiving a user-supplied password from a user of the portable data storage device;

comparing the user-supplied password from the user of the portable data storage device with a stored password in the portable data storage device; and provided that the user-supplied password corresponds to the stored password, granting the user of the portable data storage device access to requested data.

4. The method as recited in claim 3 further comprising the step of decrypting the stored password.

5. The method as recited in claim 3 further comprising the step of denying the user of the portable data storage device access to the requested data provided that the user-supplied password does not correspond to the stored password.

* * * * *